(12) United States Patent
Ranz et al.

(10) Patent No.: US 9,903,477 B2
(45) Date of Patent: Feb. 27, 2018

(54) SELF-CENTERING LABYRINTH SEAL

(71) Applicants: DRESSER-RAND COMPANY, Olean, NY (US); Andrew J. Ranz, Enfield, CT (US); Zin Min Aye, Yangon (MM); Celeste To, San Gabriel, CA (US); Phoebe DeGroot, Newton, MA (US)

(72) Inventors: Andrew J. Ranz, Enfield, CT (US); Zin Min Aye, Yangon (MM); Celeste To, San Gabriel, CA (US); Phoebe DeGroot, Newton, MA (US)

(73) Assignee: Dresser-Rand Company, Olean, NY (US)

( * ) Notice: Subject to any disclaimer, the term of this patent is extended or adjusted under 35 U.S.C. 154(b) by 26 days.

(21) Appl. No.: 14/908,263

(22) PCT Filed: Jul. 23, 2014

(86) PCT No.: PCT/US2014/047749
§ 371 (c)(1),
(2) Date: Jan. 28, 2016

(87) PCT Pub. No.: WO2015/030956
PCT Pub. Date: Mar. 5, 2015

(65) Prior Publication Data
US 2016/0169394 A1 Jun. 16, 2016

Related U.S. Application Data

(60) Provisional application No. 61/870,987, filed on Aug. 28, 2013.

(51) Int. Cl.
*F16J 15/447* (2006.01)
*F16J 15/44* (2006.01)
*F04D 29/057* (2006.01)
*F04D 29/16* (2006.01)

(52) U.S. Cl.
CPC .......... *F16J 15/445* (2013.01); *F04D 29/057* (2013.01); *F04D 29/162* (2013.01); *F16J 15/4476* (2013.01)

(58) Field of Classification Search
CPC .... F16J 15/445; F16J 15/4476; F04D 29/057; F04D 29/162
USPC .................................................. 277/303, 412
See application file for complete search history.

(56) References Cited

U.S. PATENT DOCUMENTS

| | | | | |
|---|---|---|---|---|
| 5,509,664 A * | 4/1996 | Borkiewicz | ............ | F16J 15/442 277/543 |
| 5,810,365 A * | 9/1998 | Brandon | ................ | F16J 15/442 277/416 |
| 6,039,535 A * | 3/2000 | Kobayashi | ............ | F04D 29/102 415/172.1 |
| 6,932,350 B1 * | 8/2005 | Husted | ................... | F16J 15/406 277/421 |

* cited by examiner

Primary Examiner — Nathan Cumar

(57) ABSTRACT

An annular seal may include a seal body configured for disposing around a rotor, a plurality of grooves and a plurality of projections formed on an inner circumferential surface of the seal body, and a plurality of dams circumferentially disposed on a first surface of the seal body. The first surface may extend radially from the inner circumferential surface of the seal body. The plurality of dams may be configured to increase a pressure of a working fluid contacting the plurality of dams such that the increase in the pressure may center the annular seal about the rotor.

14 Claims, 5 Drawing Sheets

SELF-CENTERING LABYRINTH SEAL

CROSS-REFERENCE TO RELATED APPLICATIONS

This application claims priority to U.S. Provisional Patent Application having Ser. No. 61/870,987, which was filed Aug. 28, 2013. This priority application is hereby incorporated by reference in its entirety into the present application to the extent consistent with the present application.

BACKGROUND

FIG. 1 illustrates a cross-sectional view of a conventional turbomachine, e.g., centrifugal compressor 100, including labyrinth seals 101. As illustrated, the labyrinth seals 101 are disposed about the rotor components, e.g., impellers 102, of the centrifugal compressor 100. Additional labyrinth seals 103 may be disposed about other rotor components, e.g., a shaft 104, of the centrifugal compressor 100. An inner circumferential surface 105 of the labyrinth seals 101, 103 and an outer circumferential surface 107 of the rotor components (e.g., impellers 102 and the shaft 104) may define a radial gap 109 (exaggerated in FIG. 1 for the sake of clarity) therebetween.

During operation of the turbomachine, the rotor components (or, the rotor, hereafter) may become eccentric with respect to the labyrinth seals 101, 103. When this occurs, the rotor may contact one or more of the labyrinth seals 101, 103, and the labyrinth seals 101, 103 may be damaged. Additionally, when the rotor becomes eccentric with respect to the labyrinth seals 101, 103, leakage across the labyrinth seals 101, 103 may increase.

Currently, expensive and time consuming techniques, such as laser alignment, hand polishing and grinding, etc. are employed in order to maintain the rotor concentric with the labyrinth seals. However, even these expensive and time consuming techniques do not provide optimum results.

What is needed, then, is a relatively inexpensive and simple technique of maintaining the rotor concentric with the labyrinth seals.

SUMMARY

Example embodiments of the disclosure provide an annular seal. The annular seal may include a seal body configured for disposition around a rotor, a plurality of grooves and a plurality of projections formed on an inner circumferential surface of the seal body, and a plurality of dams circumferentially disposed on a first surface of the seal body. The first surface may extend radially from the inner circumferential surface of the seal body. The plurality of dams may be configured to increase a pressure of a working fluid contacting the plurality of dams such that the increase in the pressure may center the annular seal about the rotor.

Example embodiments of the disclosure may further provide an annular seal. The annular seal may include a seal body configured for disposition around a rotor. An outer circumferential surface of the seal body may define at least partially a first portion having a first diameter and a second portion having a second diameter less than the first diameter. The annular seal may further include a plurality of grooves and a plurality of projections formed on an inner circumferential surface of the seal body, and a plurality of dams circumferentially disposed on a first surface of the second portion. The first surface may extend radially from the inner circumferential surface of the seal body. The plurality of dams may be configured to increase a pressure of a working fluid contacting the plurality of dams such that the increase in the pressure may center the annular seal about the rotor.

Example embodiments of the disclosure may still further provide an annular seal. The annular seal may include a seal body having a first surface, a second surface axially opposite the first surface, an outer circumferential surface extending between the first surface and the second surface, and an inner circumferential surface extending between the first surface and the second surface. The outer circumferential surface and the inner circumferential surface may be radially separated from each other. The outer circumferential surface may define at least partially a first portion having a first diameter and a second portion having a second diameter less than the first diameter. The annular seal may further include a plurality of grooves and a plurality of projections formed on the inner circumferential surface and extending between the first surface and the second surface, and a plurality of dams circumferentially disposed on the second surface. The plurality of dams may form at least partially the second portion of the outer circumferential surface of the seal body. The plurality of dams may be configured to increase a pressure of a working fluid contacting the plurality of dams such that the increase in the pressure may center the annular seal about a rotor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
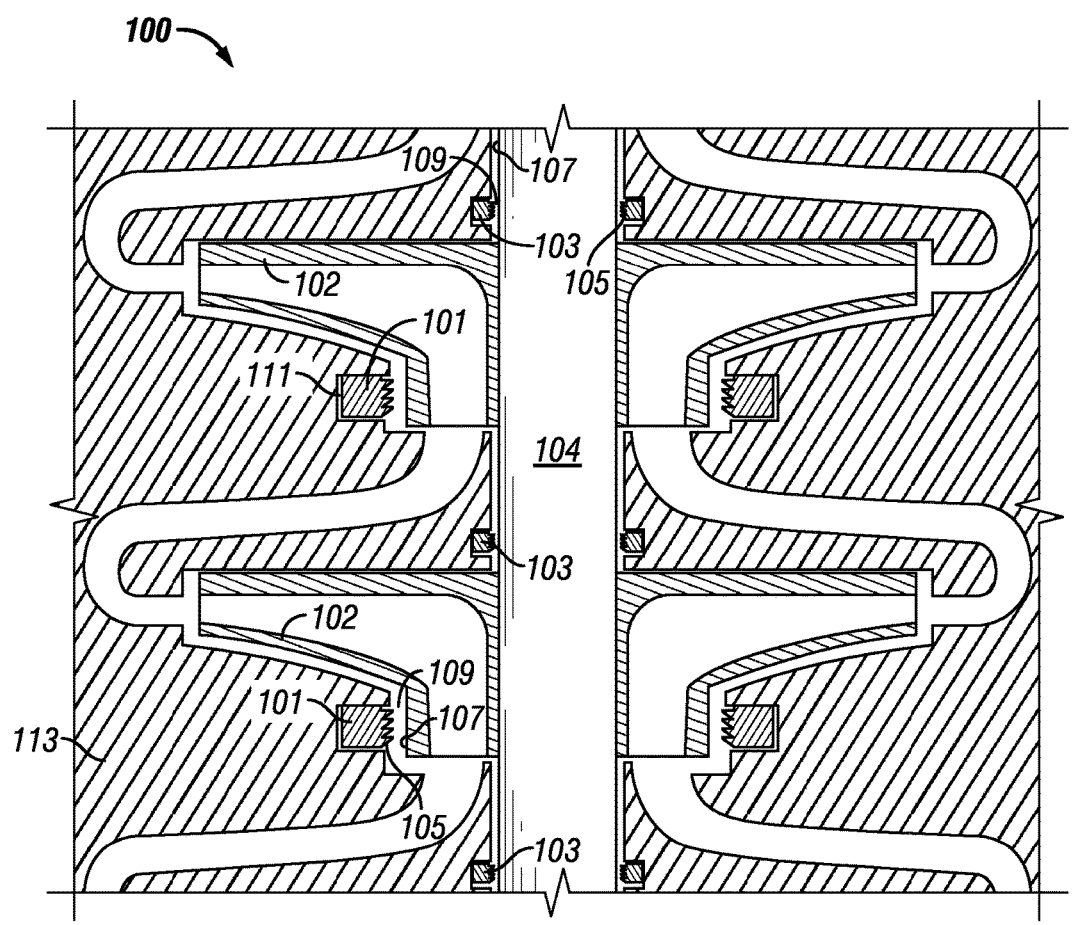
FIG. 1 illustrates a cross-sectional view of a portion of a conventional turbomachine including labyrinth seals.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
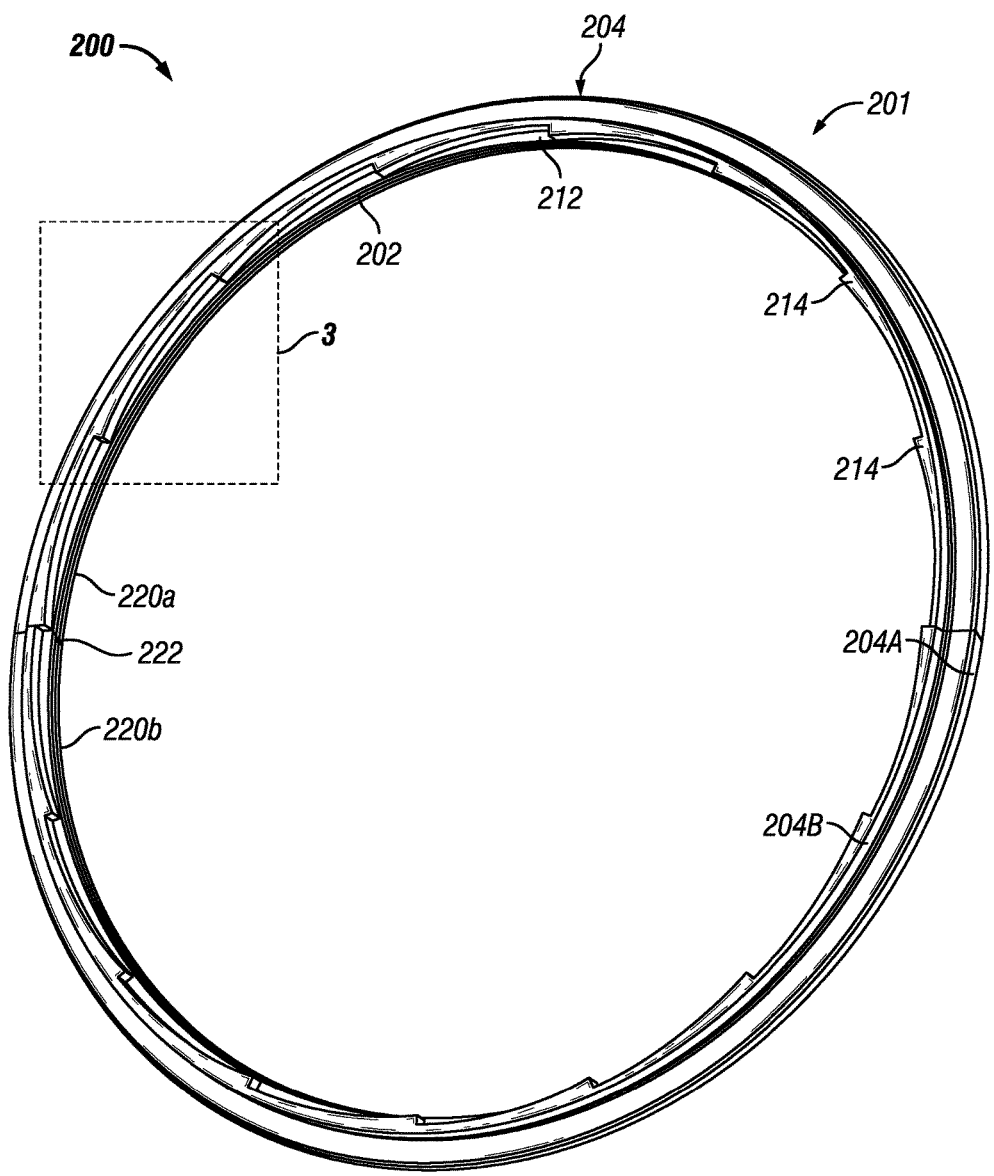
FIG. 2 illustrates a perspective view of a seal, according to example embodiments disclosed.
Figure 3:
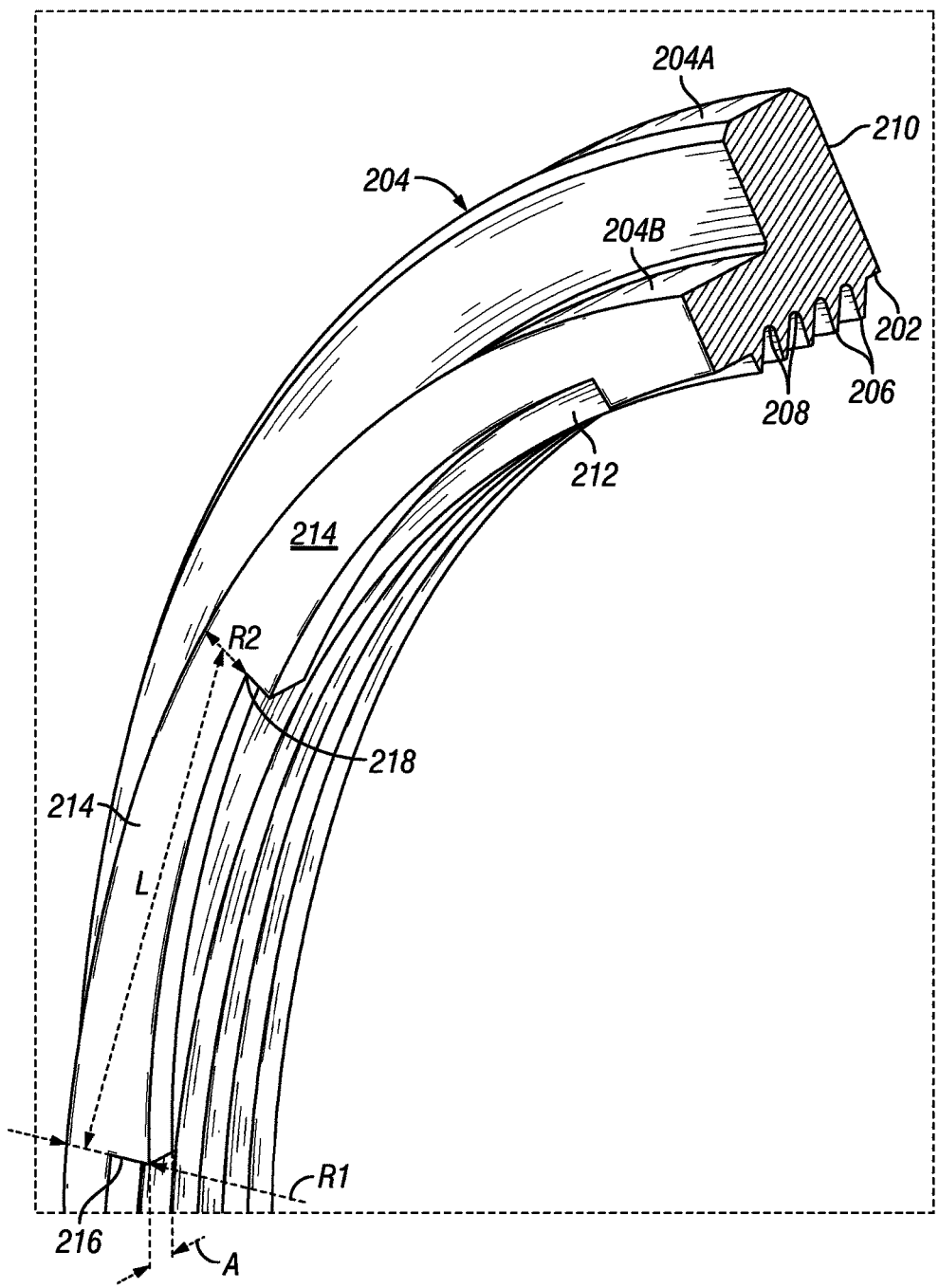
FIG. 3 illustrates a cross-sectional perspective view of a portion of the seal in FIG. 2 enclosed by the dashed lines, according to example embodiments disclosed.

FIG. 2 illustrates a perspective view of a seal 200, according to example embodiments disclosed. FIG. 3 illustrates a cross-sectional perspective view of a portion of the seal in FIG. 2 enclosed by the dashed lines, according to example embodiments disclosed. The seal 200 may be utilized in place of the labyrinth seals 101, 103 of FIG. 1. Referring to FIGS. 2 and 3, the seal 200 may have a generally annular seal body 201 defining an inner circumferential surface 202 and an outer circumferential surface 204 opposite the inner circumferential surface 202 and radially separated therefrom. The inner circumferential surface 202 of the seal 200 may extend between a low pressure surface 210 (FIG. 3) and a high pressure surface 212 (FIG. 3) and may have a plurality of projections 206 and a plurality of grooves 208 (e.g., annular or helical grooves) formed between adjacent projections 206. When the seal 200 is disposed about the rotor, the inner circumferential surface 202 and the outer circumferential surface 107 of the rotor may define the radial gap 109 therebetween. The plurality of projections 206 and the plurality of grooves 208 may form a tortuous path in the radial gap 109 which may substantially reduce an amount of working fluid flowing across the seal 200.

The outer circumferential surface 204 may define an outer diameter of the seal 200, and may include a first portion 204A having a first diameter and a second portion 204B having a second diameter less than the first diameter. When installed in the turbomachine, the second portion 204B of the seal 200 may be subjected to a higher pressure working fluid, e.g., process gas, in the centrifugal compressor compared to the first portion 204A. The seal 200 may define the low pressure surface 210 on the first portion 204A and the high pressure surface 212 positioned axially opposite the low pressure surface 210 and on the second portion 204B. The plurality of projections 206 and the plurality of grooves 208 may extend (e.g., in an axial direction) between the low pressure surface 210 and the high pressure surface 212.

The high pressure surface 212 of the seal 200 may include a plurality of dams 214 disposed circumferentially, e.g., at equal intervals, on the high pressure surface 212. The plurality of dams 214 may thus be exposed to the higher pressure process gas. As illustrated in FIG. 3, each dam 214 of the plurality of dams 214 may feature a ramp-like profile between two circumferential ends 216, 218 thereof. A radial height R1 of each dam 214 at the end 216 may be greater than a radial height R2 of each dam 214 at the end 218. The axial width A of each dam 214 between the two ends 216, 218 may be constant. It should be noted that the circumferential ends 216, 218 may not define the physical boundaries of each dam 214, but may define a general circumferential extent of each dam 214. As illustrated in FIGS. 2 and 3, an end 216 of one dam 214 and an end 218 of an adjacent dam 214 may coincide. In an example embodiment, the plurality of dams 214 may form at least partially the second portion 204B of the outer circumferential surface 204 of the seal 200.

During operation, the seal 200 may be exposed to the high pressure process gas which may be swirling in the centrifugal compressor. The swirling high pressure process gas may strike the end 216 (having the greater radial height R1) of each dam 214 of the plurality of dams 214 disposed on the high pressure surface 212. The circumferential velocity head of the swirling high pressure process gas suddenly being impeded by the dam 214 may be converted to a pressure head, thereby creating pressure points at or adjacent the ends 216.

Referring briefly to FIG. 1, the seal 200 may be located in a cavity 111 defined in the casing 113 of the centrifugal compressor 100. The size, e.g., the inner diameter, of the cavity 111 may be greater (to a certain degree) than the size (e.g., outer diameter) of the seal 200, and, as a result, the seal 200 may not be confined to a fixed location in the cavity 111, but may be relatively free to move in the cavity 111. It should, however, be noted that the size of the cavity 111 may be dependent on the maximum permissible rotor excursion which may be limited to a certain predetermined radial distance.

Returning to FIGS. 2 and 3, the pressure head generated at the pressure point may exert a force on the seal 200, which due to a difference in the size between the cavity 111 (FIG. 1) and the seal 200, may center the seal 200 about the rotor. This centering operation of the seal 200 is discussed below with reference to FIGS. 4A and 4B.

Figure 4A:
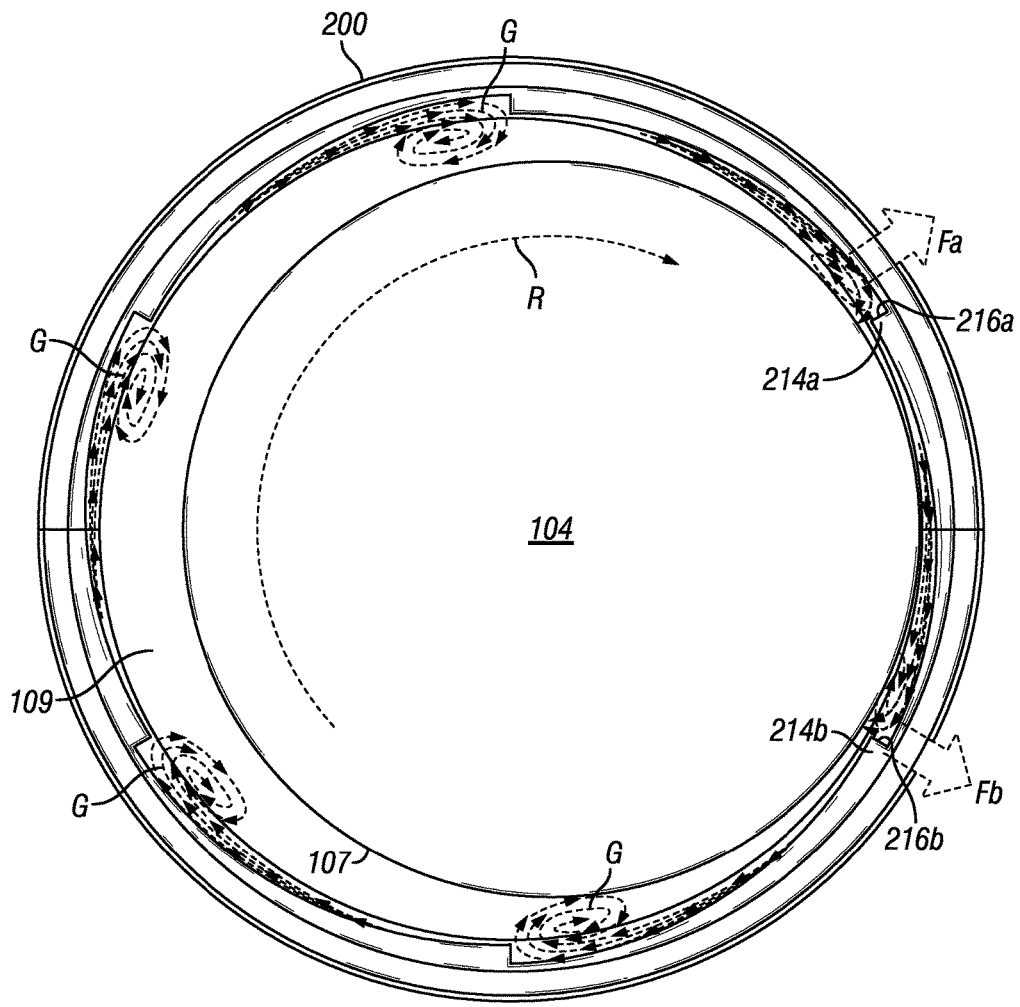
FIG. 4A illustrates the shaft in FIG. 1 and the seal in FIG. 2 eccentric with respect to each other, according to example embodiments disclosed.
Figure 4B:
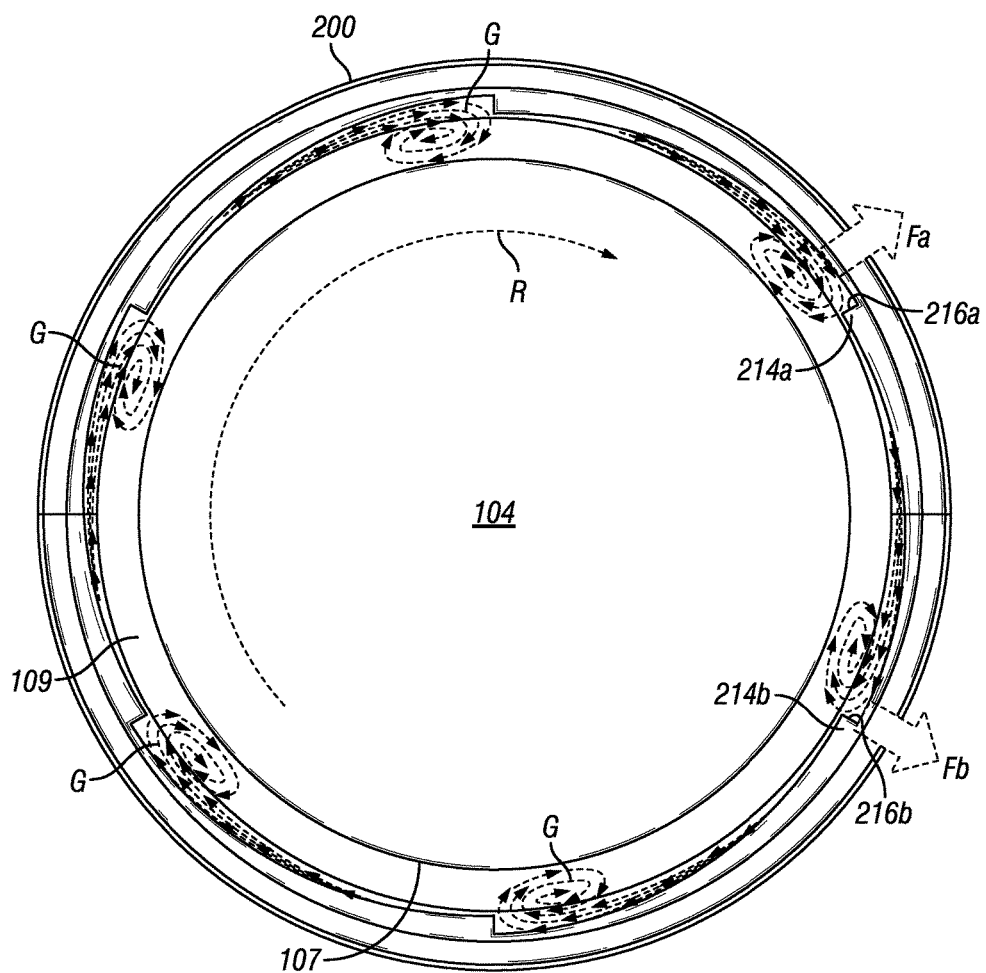
FIG. 4B illustrates the shaft in FIG. 1 and the seal in FIG. 2 concentric with respect to each other, according to example embodiments disclosed.

FIG. 4A illustrates the shaft 104 and the seal 200 eccentric with respect to each other, according to example embodiments disclosed. FIG. 4B illustrates the shaft 104 and the seal 200 concentric with respect to each other, according to example embodiments disclosed. It should be noted that, although the centering operation below is discussed with respect to the shaft 104 and the seal 200, the centering operation is not restricted thereto, and the seal 200 may be centered about the impellers 102 (FIG. 1) in a similar centering operation. FIG. 4A also illustrates the shaft 104 rotating in the direction of the arrow R and the swirling high pressure process gas G in the radial gap 109 striking the ends 216a, 216b of the respective dams 214a, 214b. The resulting pressure head at or adjacent each end 216a, 216b may exert respective forces Fa, Fb (e.g., in a radially outward direction) on the seal 200 (e.g., on the inner circumferential surface 202 of the seal 200), thereby causing the displacement of the seal 200 within the cavity 111 (FIG. 1). As a result of the forces Fa and Fb displacing the seal 200, the seal 200 may be centered about the shaft 104, as illustrated in FIG. 4B. Stated otherwise, because the seal 200 may not be radially constrained (due to the difference in size between the cavity 111 and the seal 200), a pressure differential may be created between the pressure acting on the inner circumferential surface 202 of the seal 200 and the pressure acting on the outer circumferential surface 204 of the seal 200 in the region of the dams 214a and 214b, and this pressure differential may generate a net force, e.g., forces Fa, Fb, which may center the seal 200 about the shaft 104.

FIGS. 4A and 4B illustrate only two forces Fa and Fb being exerted on the seal 200; however, it should be understood that other force(s) due to pressure head(s) at or adjacent end(s) other than ends 216a, 216b may also contribute in centering the seal 200 about the shaft 104. It should be noted that the force generated may be dependent on one or more of the dam radial heights R1, R2 (FIG. 3), dam axial width A (FIG. 3), dam length L (e.g., perpendicular distance between the ends 216, 218 of a dam 214 (FIG. 3); which, in instances, may be different for different dams of the seal), the dam profile (ramp, step, or the like) and the number of dams 214.

Further, it should be noted that when the seal 200 is centered about the shaft 104, the forces acting on the inner circumferential surface 202 of the seal 200 due to the swirling high pressure process gas G striking the dams 214 may cancel each other and the seal 200 may remain centered about the shaft 104. However, if the seal 200 and the shaft 104 were to become eccentric with respect to each other, the seal 200 may be centered about the shaft 104 as discussed above. It may thus be appreciated that the seal 200 is "self-centering" and may not require an external input to be centered about the shaft 104.

According to example embodiments, the seal 200 may be a unitary (single, non-divisible) structure or may be manufactured as two (220a, 220b in FIG. 2) or more segments having a joint 222 therebetween. The two or more segments may be held together using suitable means, e.g., using a radial spring disposed on the outer circumferential surface of the assembled multi-segment seal and held in position by coupling the two free ends of the radial spring together.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. An annular seal, comprising:
   a seal body having a plurality of adjoining, sector-shaped segments, which are oriented, relative to each other, in an annular profile that is configured for disposition around a rotor, each of the sector-shaped segments including:
   a plurality of grooves and a plurality of projections formed on an inner circumferential surface of the seal body; and
   a unistructural, repetitive pattern of a plurality of sawtooth profile dams circumferentially disposed on a high pressure side and on the inner circumferential surface of the seal body, axially adjacent the plurality of grooves and the plurality of projections, the dams extending radially inwardly, each dam of the repetitive pattern of a plurality of dams having a first circumferential end, a second circumferential end, and an axial width on the inner circumferential surface between the first and second circumferential ends, and extends parallel to an axial axis of the seal body, wherein
   the first circumferential end of one dam conjoins monolithically the second circumferential end of a circumferentially adjacent dam,
   a radial height of the first circumferential end is greater than a radial height of the second circumferential end, and
   the plurality of dams are configured to increase a pressure of a working fluid contacting the respective first circumferential ends of the plurality of dams such that the increase in the pressure centers the annular seal about the rotor.

2. The annular seal of claim 1, wherein the axial width of each dam of the plurality of dams is the same.

3. The annular seal of claim 1, wherein the plurality of grooves are helical.

4. The annular seal of claim 1, wherein the plurality of grooves are annular.

5. The annular seal of claim 1, wherein the seal body is a unitary, annular structure, or comprises at least two sector-shaped, annular segments that are conjoined to form an annular structure.

6. An annular seal, comprising:
   a seal body having a plurality of adjoining, sector-shaped segments, which are oriented, relative to each other, in an annular profile that is configured for disposition around a rotor, an outer circumferential surface of the seal body defining at least partially a first portion having a first diameter and a second portion having a second diameter less than the first diameter, each of the sector-shaped segments including:
   a plurality of grooves and a plurality of projections formed on an inner circumferential surface of the seal body; and
   a unistructural, repetitive pattern of a plurality of sawtooth profile dams circumferentially disposed on a high pressure side and on the inner circumferential surface of the second portion of the seal body, axially adjacent the plurality of grooves and the plurality of projections, the dams extending radially inwardly, each dam of the repetitive pattern of a plurality of dams having a first circumferential end a second circumferential end, and an axial width on the inner circumferential surface between the first and second circumferential ends, and extends parallel to an axis of the seal body, wherein
   the first circumferential end of one dam conjoins monolithically the second circumferential end of a circumferentially adjacent dam,
   a radial height of the first circumferential end is greater than a radial height of the second circumferential end, and
   the plurality of dams are configured to increase a pressure of a working fluid contacting the respective first circumferential ends of the plurality of dams such that the increase in the pressure centers the annular seal about the rotor.

7. The annular seal of claim 6, wherein the axial width of each dam of the plurality of dams is the same.

8. The annular seal of claim 6, wherein the circumferential end of each dam having the greater radial height is configured to increase the pressure of the working fluid.

9. The annular seal of claim 6, wherein the plurality of grooves are helical.

10. The annular seal of claim 6, wherein the plurality of grooves are annular.

11. The annular seal of claim 6, wherein the seal body is a unitary, annular structure, or comprises at least two sector-shaped, annular segments that are conjoined to form an annular structure.

12. An annular seal, comprising:
a unistructural, annular-shaped seal body having a first axial surface, a second axial surface axially opposite the first axial surface, an outer circumferential surface extending between the first axial surface and the second axial surface, and an inner circumferential surface extending between the first axial surface and the second axial surface, wherein
the outer circumferential surface and the inner circumferential surface are radially separated from each other, and
the outer circumferential surface defines at least partially a first portion having a first diameter and a second portion having a second diameter less than the first diameter;
a plurality of grooves and a plurality of projections formed on the inner circumferential surface and extending between the first axial surface and the second axial surface; and
a unistructural, repetitive pattern of a plurality of sawtooth profile dams circumferentially disposed on the second axial surface and on the inner circumferential surface of the seal body, axially adjacent the plurality of grooves and the plurality of projections, the dams extending radially inwardly, wherein
each dam of the repetitive pattern of a plurality of dams has a first circumferential end, a second circumferential end, and an axial width on the inner circumferential surface between the first and second circumferential ends, and extends parallel to an axis of the seal body,
a radial height of the first circumferential end is greater than a radial height of the second circumferential end,
the first circumferential end of one dam conjoins monolithically the second circumferential end of a circumferentially adjacent dam,
the plurality of dams are axially aligned with the second portion of the outer circumferential surface of the seal body, and
the plurality of dams are configured to increase a pressure of a working fluid contacting the respective first circumferential ends of the plurality of dams such that the increase in the pressure centers the annular seal about a rotor.

13. The annular seal of claim 12, wherein the axial width of each dam of the plurality of dams is the same.

14. The annular seal of claim 12, wherein the seal body is a one-piece, unitary, annular structure, or comprises at least two sector-shaped, annular segments that are conjoined to form an annular structure.

* * * * *